(12) United States Patent
Kawai et al.

(10) Patent No.: US 10,599,962 B2
(45) Date of Patent: Mar. 24, 2020

(54) DATA GENERATING APPARATUS, DATA GENERATING METHOD, AND NON-TRANSITORY COMPUTER-READABLE MEDIUM CONTAINING INSTRUCTIONS FOR MANAGING DELETION OF TAPE PRINTING DATA BASED ON PARENT-CHILD RELATIONSHIP

(71) Applicant: Brother Kogyo Kabushiki Kaisha, Nagoya-shi, Aichi-ken (JP)

(72) Inventors: Junya Kawai, Kiyosu (JP); Tomoki Miyashita, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/278,702

(22) Filed: Sep. 28, 2016

(65) Prior Publication Data

US 2017/0091598 A1 Mar. 30, 2017

(30) Foreign Application Priority Data

Sep. 29, 2015 (JP) .................................. 2015-190669

(51) Int. Cl.
*G06K 15/02* (2006.01)
*B41J 3/407* (2006.01)

(52) U.S. Cl.
CPC .......... *G06K 15/028* (2013.01); *B41J 3/4075* (2013.01); *G06K 15/022* (2013.01)

(58) Field of Classification Search
CPC ...................................................... B41J 3/4075
See application file for complete search history.

(56) References Cited

U.S. PATENT DOCUMENTS

2002/0197090 A1* 12/2002 Akaiwa .................. B41J 3/4075
400/76
2003/0110441 A1* 6/2003 Tsukuda ................. B41J 3/4075
715/255
2004/0145762 A1* 7/2004 Kurashina .............. B41J 3/4075
358/1.11

(Continued)

FOREIGN PATENT DOCUMENTS

JP 2003-266800 A 9/2003

*Primary Examiner* — Ted W Barnes
(74) *Attorney, Agent, or Firm* — Banner & Witcoff, Ltd.

(57) ABSTRACT

A data generating apparatus includes a first storage storing a content having multiple regions, a second storage storing a parent-child relationship table, a first identifier configured to identify a target region, an updater configured to update the characters included in the target region, a changer configured to change the target region to a parent region corresponding to the target region when a carry occurs during updating, and a generator configured to generate print data of the content. The updater is configured to update the characters included in the changed target region, and the data generating apparatus further includes a second identifier configured to identify a deletion region, a first deleter configured to delete the deletion region from the content, and a second deleter configured to delete a parent region and a child region corresponding to the deletion region based on the parent-child relationship table of the deletion region.

9 Claims, 9 Drawing Sheets

(56) References Cited

U.S. PATENT DOCUMENTS

| | | | | |
|---|---|---|---|---|
| 2006/0222431 | A1* | 10/2006 | Kato | B41J 3/4075 |
| | | | | 400/621 |
| 2009/0106649 | A1* | 4/2009 | Nose | G06F 17/211 |
| | | | | 715/243 |
| 2009/0327262 | A1* | 12/2009 | Grack | G06F 17/30011 |
| 2014/0293353 | A1* | 10/2014 | Nagata | H04N 1/32101 |
| | | | | 358/1.15 |

* cited by examiner

DATA GENERATING APPARATUS, DATA GENERATING METHOD, AND NON-TRANSITORY COMPUTER-READABLE MEDIUM CONTAINING INSTRUCTIONS FOR MANAGING DELETION OF TAPE PRINTING DATA BASED ON PARENT-CHILD RELATIONSHIP

This application claims priority under 35 U.S.C. § 119 from Japanese Patent Application No. 2015-190669 filed on Sep. 29, 2015. The entire subject matter of the application is incorporated herein by reference.

BACKGROUND

Technical Field

The present disclosures relate to an apparatus and a method to create data, and a non-transitory computer-readable medium containing instructions to create data, according to which a content including characters having a particular arrangement order (e.g., numerals, alphabets and the like) can be printed.

Related Art

Conventionally, a tape printer having a numbering-printing function has been known. The numbering-printing function is to print a numbering character string consisting of characters having a particular advancing order such as alphabets and numerals, with sequentially advancing the characters included in the character string in accordance with the order. Typically, a numbering character string and the number of times of updating the numbering character string in accordance with the advancing order are input by a user. Then, the tape printer prints the numbering character string by the input number of times with sequentially advancing the numbering character string in accordance with the advancing order on a printing tape. It is noted that the tape printer executes such a printing operation by the input number of times.

SUMMARY

In such a tape printer, there is a technique to associate multiple numbering character strings respectively arranged at multiple regions such that advancing of the order of one of the numbering character strings affects the order of the other of the numbering character strings. For example, when two number strings are arranged in two regions, respectively, and there is a hierarchical order between the two regions, the number string in the region having a higher hierarchical order may be incremented only when there is a carry in the number string in the region having a lower hierarchical order. In the following description, a region of interest will be referred to as a target region, a region having a lower hierarchical order than the target region will be referred to as a child region, and a region having a higher hierarchical order than the target region will be referred to as a parent region. In such a relationship, when there is a carry in the child region, the number string in the target region is incremented. When a carry occurs in the target region, the number string in the parent region is advanced. In the following description, the above-described relationship in which multiple regions are connected in a certain order will be referred to as a parent-child relationship or a hierarchical relationship.

In the tape printer described above, there is a case where one of the hierarchically connected multiple regions, each of which contains a numbering character string, may be deleted. For example, a case where there are three regions (i.e., a parent region, a target region and a child region), and it is assumed that the numbering character string in the target region is deleted. In such a case, if a carry occurs in the child region, it is uncertain whether the numbering character string in the parent region is updated (i.e., advanced).

According to aspects of the disclosures, there is provided an improved data generating apparatus, an improved data generating method, and a non-transitory computer-readable medium containing instructions to create data, according to which, it is suppressed to create data for printing a content including the numbering character strings of which an updating method is undefined when one of the regions is deleted.

According to aspects of the disclosures, there is provided a data generating apparatus, which is provided with a first storage configured to store a content to which multiple regions are assigned, each of the multiple regions including characters which can be repeatedly advanced in accordance with a particular advancing order, a second storage configured to store a parent-child relationship table, which is a table illustrating a parent-child relationship among the multiple regions, a parent region having a parent relationship and/or a child region having a child relationship being associated with each of the multiple region, a first identifier configured to identify one of the multiple regions as a target region, an updater configured to update the characters included in the target region identified by the first identifier by advancing the characters included in the target region identified by the first identifier in accordance with the particular advancing order, a changer configured to change the target region to a parent region corresponding to the target region based on the parent-child relationship table of the target region stored in the second storage when a carry, in which the characters change from a last arrangement in the particular advancing order to a first arrangement in the particular advancing order, occurs when updated by the updater, and a generator configured to generate print data of the content of which characters are updated based on the content stored in the first storage when no carry occurs when the characters are updated by the updater. The updater is configured to update the characters included in the target region which has been changed by the changer, and the data generating apparatus further includes a second identifier configured to identify one of the multiple regions as a deletion region, a first deleter configured to delete the deletion region identified by the second identifier from the content, and a second deleter configured to delete a parent region corresponding to the deletion region and a child region corresponding to the deletion region based on the parent-child relationship table of the deletion region.

According to aspects of the disclosures, there is provided a non-transitory computer-readable medium for a data generating apparatus having a computer, a first storage configured to store a content to which multiple regions are assigned, each of the multiple regions including characters which can be repeatedly advanced in accordance with a particular advancing order, and a second storage configured to store a parent-child relationship table, which is a table illustrating a parent-child relationship among the multiple regions, a parent region having a parent relationship and/or a child region having a child relationship being associated with each of the multiple region. The non-transitory computer-readable medium contains instructions which cause, when executed by the computer, the data generating apparatus to execute a first identifying step to identify one of the multiple regions as a target region, an updating step to update the characters included in the target region identified by the first identifier by advancing the characters included in the target region identified by the first identifying step in accordance with the particular advancing order, a changing step to change the target region to a parent region corresponding to the target region based on the parent-child relationship table of the target region stored in the second storage when a carry, in which the characters change from a last arrangement in the particular advancing order to a first arrangement in the particular advancing order, occurs when updated by the updating step, and a generating step to generate print data of the content of which characters are updated based on the content stored in the first storage when no carry occurs when the characters are updated by the updating step. The updating step further updates the characters included in the target region which has been changed by the changing step, and the instructions cause the data generating apparatus to further execute a second identifying step to identify one of the multiple regions as a deletion region, a first deleting step to delete the deletion region identified by the second identifying step from the content, and a second deleting step to delete a parent region corresponding to the deletion region and a child region corresponding to the deletion region based on the parent-child relationship table of the deletion region.

According to aspects of the disclosures, there is provided a data generating method for a data generating apparatus having a computer, a first storage configured to store a content to which multiple regions are assigned, each of the multiple regions including characters which can be repeatedly advanced in accordance with a particular advancing order, and a second storage configured to store a parent-child relationship table, which is a table illustrating a parent-child relationship among the multiple regions, a parent region having a parent relationship and/or a child region having a child relationship being associated with each of the multiple region. The method includes a first identifying step to identify one of the multiple regions as a target region, an updating step to update the characters included in the target region identified by the first identifier by advancing the characters included in the target region identified by the first identifying step in accordance with the particular advancing order, a changing step to change the target region to a parent region corresponding to the target region based on the parent-child relationship table of the target region stored in the second storage when a carry, in which the characters change from a last arrangement in the particular advancing order to a first arrangement in the particular advancing order, occurs when updated by the updating step, and a generating step to generate print data of the content of which characters are updated based on the content stored in the first storage when no carry occurs when the characters are updated by the updating step. The updating step further updates the characters included in the target region which has been changed by the changing step, and The method further includes a second identifying step to identify one of the multiple regions as a deletion region, a first deleting step to delete the deletion region identified by the second identifying step from the content, and a second deleting step to delete a parent region corresponding to the deletion region and a child region corresponding to the deletion region based on the parent-child relationship table of the deletion region.

It is noted that, when the deletion region is deleted from among the multiple regions set to the content, a carry of the deletion region will not occur, and the characters included in the parent region corresponding to the deletion region will not be updated. Further, when the deletion region is deleted, a region including characters which will be updated in accordance with the carry of the characters of the child region corresponding to the deletion region does not exist anymore. In such a case, the data generating apparatus deletes the deletion region, the parent region corresponding to the deletion region and the child region corresponding to the deletion region from the content when the deletion region is identified. With this control, when any one of regions having a parent-child relationship is deleted, it is possible to suppress generation of print data of a content including a region of which updating method is not defined.

BRIEF DESCRIPTION OF THE ACCOMPANYING DRAWINGS

DESCRIPTION OF EMBODIMENT AND MODIFICATIONS

Hereinafter, an illustrative embodiment and its modifications will be described with reference to the accompanying drawings. It is noted that the drawings are only referred to for illustrating technical features which can be implemented in the illustrative embodiment/modifications and aspects of the disclosures should not be limited to the configurations as illustrated/described.

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storages, hard disk drives, floppy drives, permanent storages, and the like.

Firstly, referring to FIGS. 1 and 2, an outer configuration of a tape printer 1 according to an illustrative embodiment of the present disclosures will be described. In the following description, directions are indicated such that upper-right, lower-left, lower-right, upper-left, up and down directions on a plane of FIG. 1 and FIG. 2 are referred to rear, front, right, left, up and down sides of the tape printer 1 as indicated by arrows in FIGS. 1 and 2.

<General Description on Tape Printer>

Figure 1:
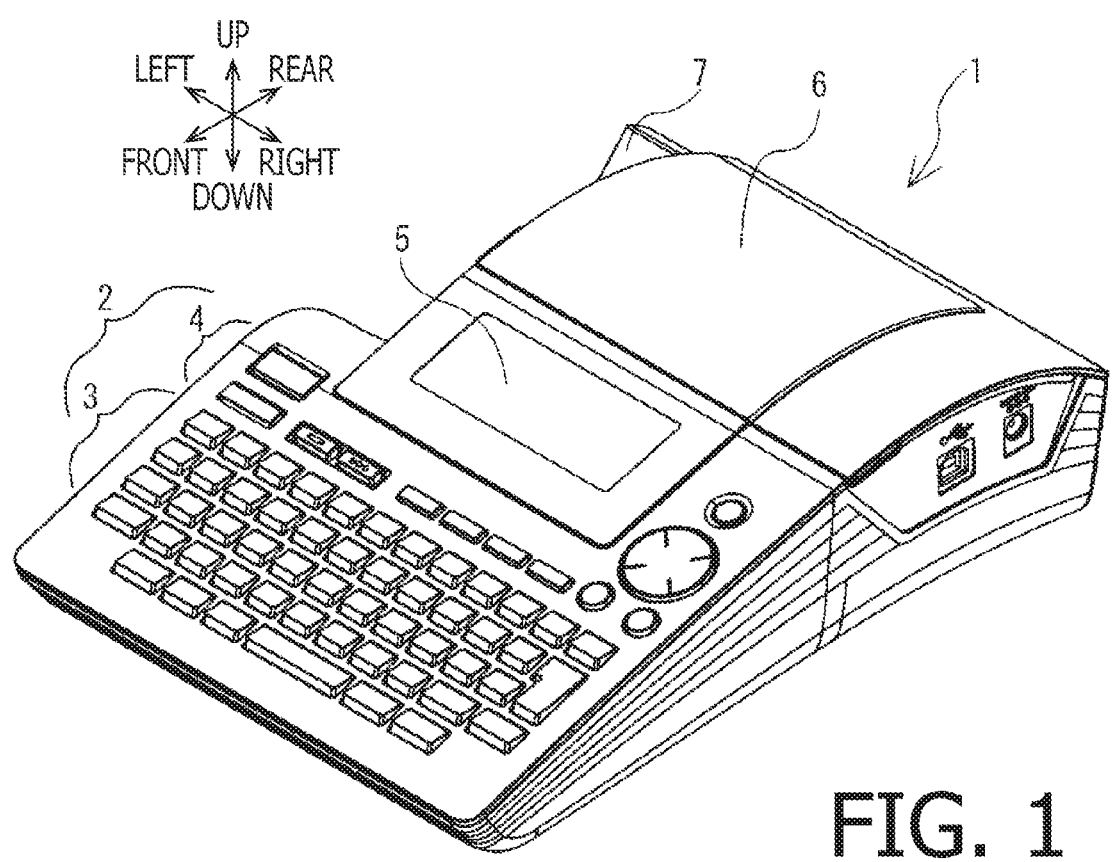
FIG. 1 is a perspective view of a tape printer when a cover thereof is closed, according to an illustrative embodiment of the disclosures.

As shown in FIG. 1, a keyboard 3 to input characters (e.g., alphanumeric characters, symbols and other characters) is arranged on an upper surface of the tape printer 1. On a rear side of the keyboard 3, a function key group 4 (e.g., a power switch, utility keys, cursor keys and the like) is arranged. The utility keys include a print key, a test key, a decision key, an Esc (escape) key, an all-clear key and a cancel key. In the following description, the keyboard 3 and the function key group 4 are collectively referred to as an operation panel 2. On the rear side of the function key group 4, a display 5 is arranged. A rear-side portion of the upper surface of the tape printer 1 is formed as a cover 6 which is openable/closeable with respect to a body of the tape printer 1. At an rear left corner part of the tape printer 1, a tape catch tray 7 is formed the tape catch tray 7 is configured to receive pieces of print-finished tape, which is cut out by a cutting mechanism (not shown).

Figure 2:
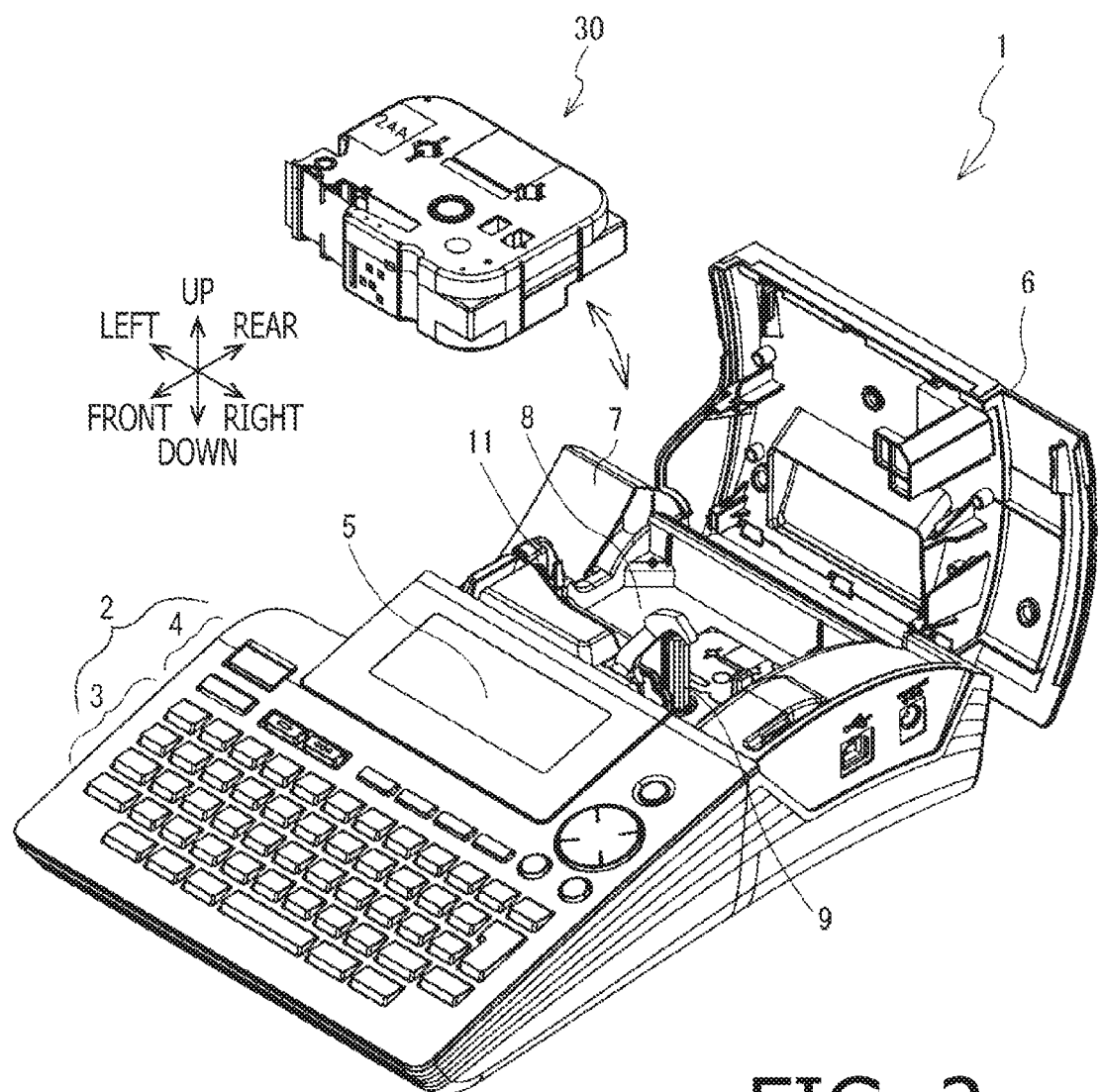
FIG. 2 is a perspective view of the tape printer and a tape cassette when the cover is opened, according to the illustrative embodiment of the disclosures.

As shown in FIG. 2, on a rear side of the display 5, a cassette mount 8 configured to receive the tape cassette 30 is formed. The tape cassette 30 is detachably attached to the cassette mount 8. According to the illustrative embodiment, the tape cassette 30 has a cassette case formed in substantially a cuboid shape (i.e., a rectangular box shape), and a tape on which characters are printed and an ink ribbon used to print characters on the tape are accommodated in the cassette case. The tape printer 1 uses the tape cassette 30 attached to the cassette mount 8 to print the characters which are input through the keyboard 3.

Figure 3:
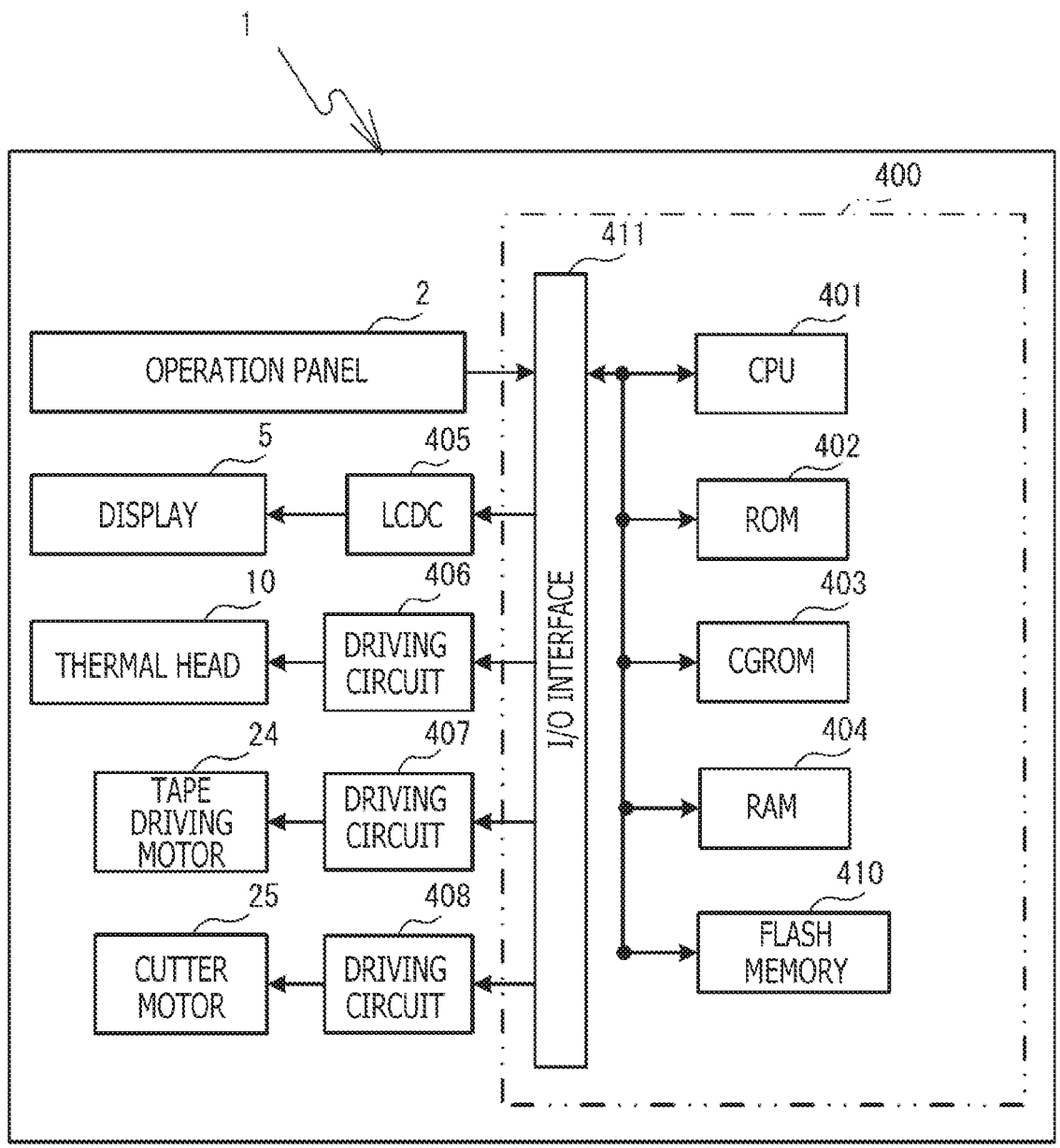
FIG. 3 is a block diagram showing electrical configuration of the tape printer according to the illustrative embodiment of the disclosures.

The cassette mount 8 is provided with a tape driving shaft 11 configured to convey the tape, a ribbon take-up shaft 9 configured to take up a used part of the ink ribbon, a thermal head 10 configured to apply heat to transfer ink from a non-used part of the ink ribbon onto the tape and the like (see FIG. 3). On a downstream side, in the tape proceeding direction, with respect the thermal head 10, a cutting mechanism (not shown) to cut out a print-finished part of the tape is provided.

<Electrical Configuration of Tape Printer>

FIG. 3 shows an electrical configuration of the tape printer 1 according to the illustrative embodiment. The tape printer 1 has a control circuit 400 which is formed on a control substrate. The control circuit 400 has a CPU (central processing unit) 401, a ROM (read only memory) 402, a CGROM (character generator ROM) 403, a RAM (random access memory) 404, a flash memory 410, an I/O (input/output) interface 411 and the like, which are interconnected through a data bus.

The ROM 402 stores various parameters which are necessary when the CPU 401 executes programs. The CGROM 403 stored print dot pattern data used to print characters. The RAM 404 has multiple storage areas including a text memory, a print buffer and the like. Further, in the RAM 404, a setting information content (described later), and a parent-child relationship table are stored. It is noted that the "content" is an image data file including characters (e.g., alphanumeric characters, Chinese characters and the like) which can be updated in accordance with a particular order. The parent-child relationship table 110N will be described later. In the flash memory 410, programs which are to be executed by the CPU 401 to control the tape printer 1 are stored. The flash memory 410 stores contents which were printed by the tape printer 1 in the past. Further, the flash memory 410 stores a setting update quantity, which will be described later.

It is noted that the programs stored in the flash memory 410 may be obtained from an external device through an interface circuit (not shown). In such a case, the CPU 401 may replace the programs stored in the flash memory 410 with the programs obtained from the external device.

The I/O interface 411 is connected with the operation panel 2, an LCDC (liquid crystal driving circuit) 405, driving circuits 406, 407 and 408, and the like. The LCDC 405 has a video RAM (not shown) which is used to output display data to a display 5. The driving circuit 406 is an electronic circuit configured to drive the thermal head 10. The driving circuit 407 is an electronic circuit used to drive a tape driving motor 24, which rotates the ribbon take-up shaft 9 and the tape driving shaft 11. The driving circuit 408 is an electronic circuit used to drive the cutter motor 25 which drives the cutting mechanism (not shown).

<General Description of Numbering Print Process>

Figure 4:
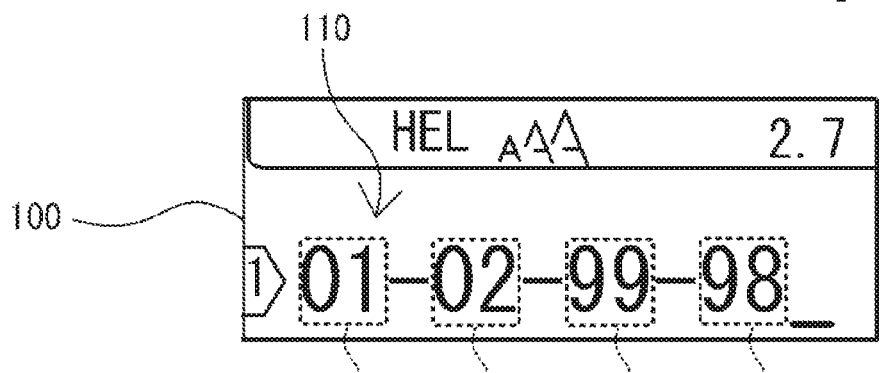
FIG. 4 is an example of an edit screen shown on a display of the tape printer according to the illustrative embodiment of the disclosures.
Figure 5:
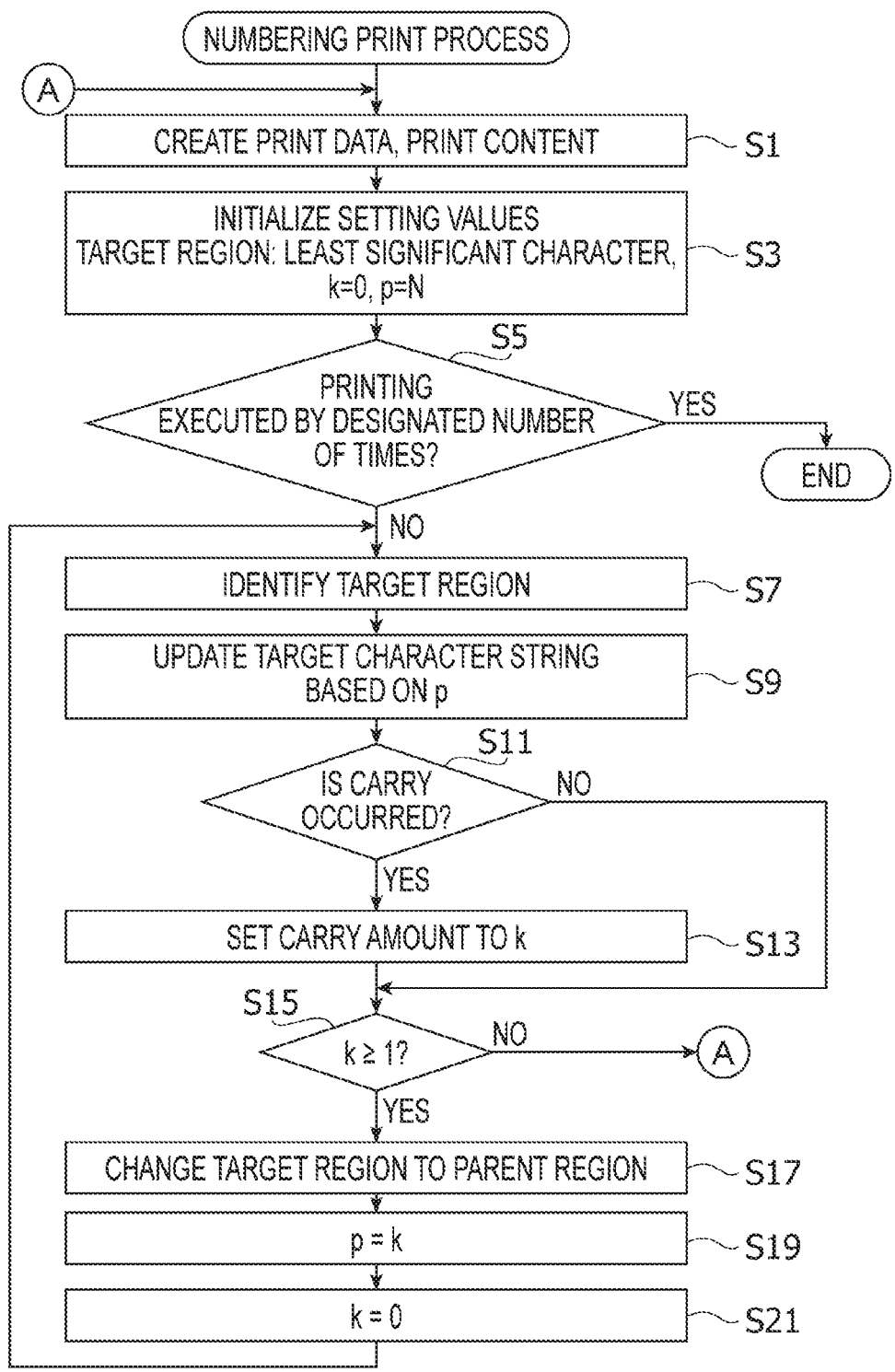
FIG. 5 is a flowchart illustrating a numbering print process according to the illustrative embodiment of the disclosures.
Figure 6:
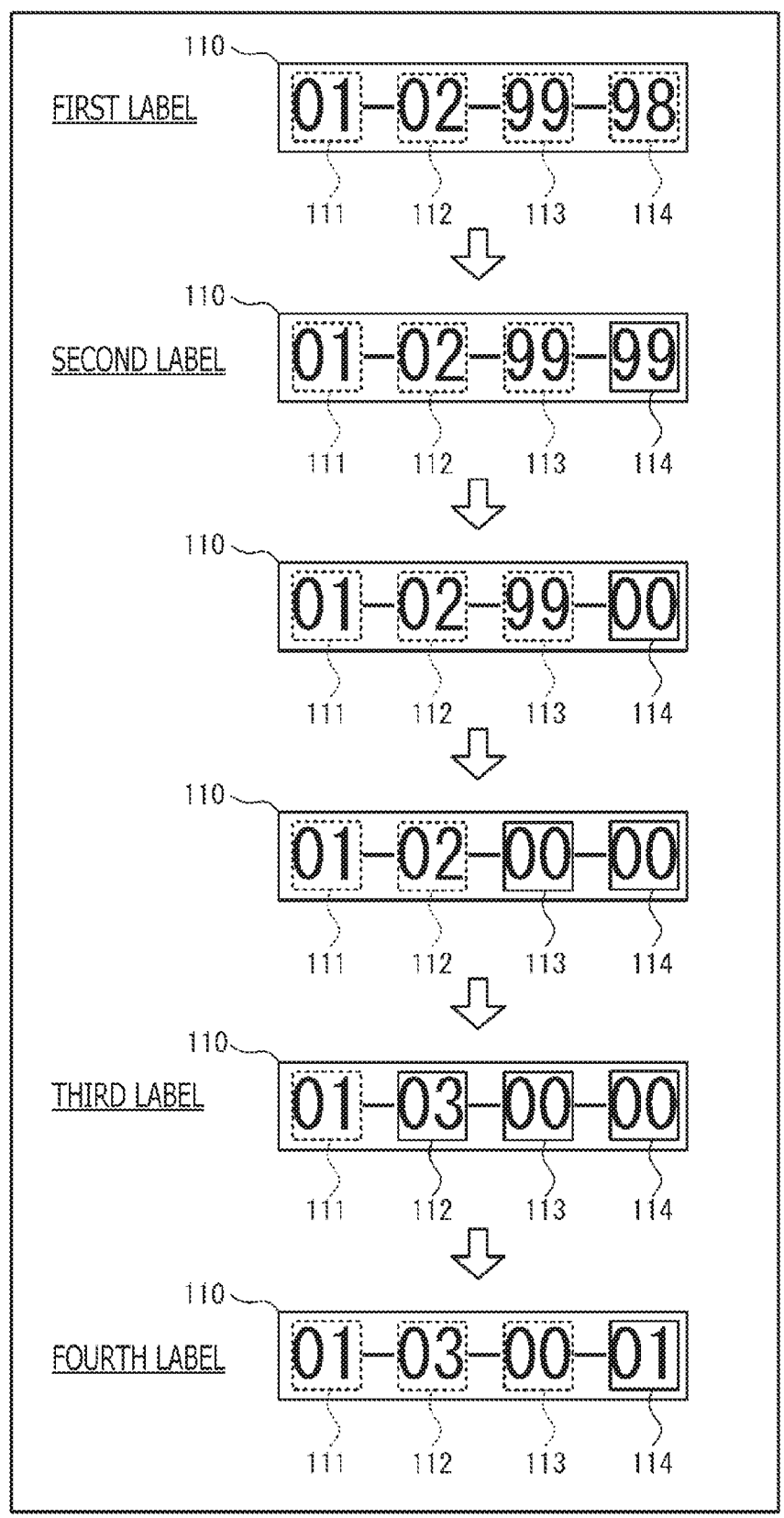
FIG. 6 illustrates a process of printing labels according to the illustrative embodiment of the disclosures.

Referring to FIGS. 4-6, a numbering print process will be described. The numbering print process is a print process to continuously print multiple contents with updating numbering character strings (i.e., advancing the characters included in the numbering character strings) in accordance with a particular advancing order.

In the numbering print process, the user designates a content which is an execution target of the numbering print process from among the contents stored in the flash memory 410 with use of the operation panel 2. Then, the user sets a numbering region of the designated content. The numbering region is a region including numbering character strings including characters, which are execution objects of the numbering print process, of the characters included in the contents.

For example, when the user designates the content 110 (see FIG. 4) which is the execution object of the numbering print process, the designated content 110 is retrieved from the flash memory 410 and stored in the RAM 404. Then, as shown in FIG. 4, the edit screen 100 is displayed on the display 5 so that the user can edit the designated content 110. For example, the user sets, with use of the operation panel 2, four numbering regions 111-114 each including numbering character string having two-digit number.

Further, the user sets a parent-child relationship table indicating a parent-child relationship among the numbering regions 111-114 with use of the operation panel 2. The parent-child relationship table 110N is a table indicating a hierarchical relationship among the numbering character strings respectively included in the numbering regions 111-114. In the parent-child relationship table 110N, each of the numbering regions 111-114 is associated with a numbering region having a parent relationship and a numbering region having a child relationship (if any). In the following description, a region having a parent relationship to a certain region will be referred to as a "parent region" of the certain region, and a region having a child relationship to the certain region will be referred to as a "child region" of the certain region.

Figure 12:
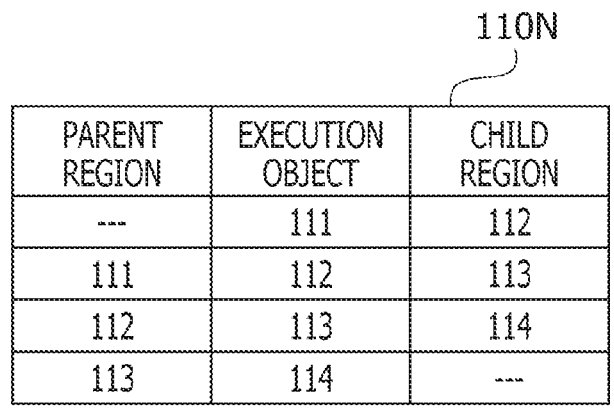
FIG. 12 shows an example of a parent-child relationship table according to the illustrative embodiment of the disclosures.

For example, the user may set the parent-child relationship table 110N as described below. Firstly, the user may associate the numbering region 112 with the numbering region 111 as the child region. Further, the user may associate the numbering region 111 with the numbering region 112 as the parent region, and the numbering region 111 with the numbering region 112 as the child region. Furthermore, the user may associate the numbering region 114 with the numbering region 113 as the child region, and the numbering region 113 with the numbering region 114 as the parent region. In this example, no parent region is associated with the numbering region 111, and no child region is associated with the numbering region 114. The above-described example of the parent-child relationship table 110N is shown as a parent-child relationship table 110N in FIG. 12. It is noted that the numbering regions 111-114 and the parent-child relationship table 110N are stored in the RAM 404 in association with the content 110.

According to the parent-child relationship table 110N of the present embodiment, the maximum number of the parent regions to be associated with one numbering region is limited to one (1), and the maximum number of the child regions to be associated with one numbering region is limited to one (1). Therefore, more than one parent regions or more than one child regions are not associated with one numbering region in the parent-child relationship table 110N.

<Numbering Print Process>

The user may instruct execution of the numbering print process by designating the number of executions with use of the operation panel 2 after setting the numbering regions and the parent-child relationship table 110N. The CPU 401 executes the numbering print process described below based on the content (hereinafter, referred to as a target content) stored in the RAM 404 by retrieving the programs stored in the flash memory 410 and executing the same.

Referring to FIG. 5, the numbering print process according to the illustrative embodiment will be described in detail. When the numbering print process is started, the CPU 401 executes printing of a content (S1). That is, the CPU 401 generates print data based on the target content, and prints the target content on a tape based on the created print data. As a print-finished part of the tape is cut-out, a label on which the target content is printed is made.

Next, the CPU 401 initializes setting information (e.g., target region information, a carry amount k, an updating amount p) stored in the RAM 404 (S3). The target region information indicates a numbering region subject to processing (hereinafter, referred to as a target region). The carry amount k represents an amount to be added to a hierarchically next region when the carry occurs in the numbering character string included in the target region. The CPU 401 sets information indicating the numbering region of which parent-child relationship is hierarchically lowest as the target region information by executing S3. It is noted that the numbering region of which parent-child relationship is hierarchically lowest is a region with which a parent region is associated but no child region is associated in the parent-child relationship table 110N. The CPU 401 sets "0" as the initial value of the carry amount k.

The updating amount p represents an amount by which the target character string is advanced according to a particular advancing order. According to the present embodiment, the numbering character string included in the target region is updated by N characters at one execution of numbering. N is a setting update quantity, which is input by the user, in advance, through the operation panel 2. The input setting update quantity is stored in the flash memory 410. For example, when the numbering character string is a number and "1" is set as N, by one execution of numbering, the numbering character string is incremented by "1" (i.e., "1" is added to the number represented by the numbering character string). For another example, when the numbering character string is alphabetical characters or the like and "1" is set as N, the numbering character string is advanced to an immediately after the character currently represented by the numbering character string according to the alphabetical order. Thus, in S3, the updating amount p is set to "N".

The CPU 401 determines whether printing has been executed by the number of times which is designated by the user after the content has been printed (S5). When the number of times of execution of S1 has not reached the user-designated number of times of printing, the CPU 401 determines that the printing has not been executed by the number of designated times (S5: NO). In this case, the CPU 401 identifies the target region based on the target region character string (S7). The CPU 401 further identifies the target character string included in the identified target region. Then, the CPU 401 updates the identified target character string based on the updating amount p (S9). With this control, the target character string is updated to a character string in which characters have been advanced by the updating amount p in accordance with the particular advancing order. For example, when the numbering character string is a number, the target character string is updated to a new number which is advance by the updating amount p in accordance with an ascending order of the number (i.e., incremented by the updating amount p).

Then, the CPU 401 determines whether a carry occurs in the target character string (S11). It is noted that, when the "carry" occurs, the target character string changes from the last one of the character string to a top one of the character string in the advancing order of the target character string. For example, when the numbering character string consists of two numerals (i.e., a two-digit number), change of the two-digit number from "99" to "00" as a result of advancing of the target character string (i.e., an overflow) corresponds to the "carry." When it is determined that the carry occurs in the target character string (S11: YES), the CPU 401 sets a advancing number after the occurrence of the carry to the carry amount k (S13). Then, the CPU 401 proceeds to S15. When it is determined that the carry has not occurred in the target character string (S11: NO), the CPU 401 proceeds to S15 without executing S13.

In S15, the CPU 401 determines whether the carry amount k is equal to or more than one. When it is determined that the carry amount k is equal to more than one (S15: YES), the CPU 401 changes the target region information based on the parent region associated with the target region in the parent-child relationship table 110N (S17). That is, the target region information is changed from information indicating the information indicating the target region to the information indicating the parent region associated with the target region.

The CPU 401 sets a value, which is the same as the carry amount k, as the updating amount p (S19). Then, the CPU 401 sets zero to the carry amount k (S21). The CPU 401 returns to S7. With this control, when the carry occurs in the target region, in the parent region that has a parent relationship with the target region, the numbering character string is updated based on the updating amount p which is the same as the carry amount k (S9). When a further carry occurs, the carry amount k is set again (S13).

When it is determined that the carry amount k is not equal to or less than one (S15: NO), the carry has not occurred in the target region. In such a case, the CPU 401 returns to S1. In S1, the CPU 401 prints out the content, in which the numbering character string has been updated by an amount for one time (S1).

The CPU 401 repeatedly executes the above process until the number of executions of S1 reaches the designated number. When the number of executions of S1 has reached the designated number (S5: YES), the CPU 401 determines that printing has been executed by the designated number of times. In this case, the CPU 401 terminates the numbering print process. With this control, multiple contents in which the numbering character string has been updated by the designated number of times are continuously printed on the tape, thereby multiple labels on which the respective contents are printing being created.

Referring to FIG. 6, a concrete example of the numbering print process illustrated in FIG. 5 will be described. In the concrete example explained below, it is assumed that the user designated "4" as the number of times of printing the content 110 shown in FIG. 4. It is also assumed that the setting update quantity N has been set to "1" in advance.

When the numbering print process shown in FIG. 5 is started, the content 110 shown in FIG. 4 is printed and the first label is created (S1). Next, the setting values are initialized (S3). At this stage the value of N (i.e., "1") is set as the updating amount p. Further, information indicating the numbering region 114, with which only the child region is associated and the parent region is not associated in the parent-child relationship table 110N (i.e., region having the lowest hierarchical relationship) is set as the target region information. Next, based on the target region information, the numbering region 114 is identified (S7). Then, the character string "98" of the numbering region 114 is updated to "99" as the updating amount p (i.e., "1") is added (S9). Since the carry does not occur, at this stage, in the numbering region 114 (S11: NO), the carry amount k is "0" (S15: NO). In this case, the updated content 110, of which the character string of the numbering region 114 is updated to "99" is printed, thereby the second label being created.

Next, based on the target region information, the numbering region 114 is identified again (S7). Then, the character string "99" of the numbering region 114 is updated to "00" as the updating amount p (i.e., "1") is added (S9). At this stage, the carry occurs (S11: YES) and the carry amount k is set to "1" (S13). Since the carry amount k is equal to or greater than "1" (S15: YES), the target region information is changed to information indicated the numbering region 113 which is associated with the numbering region 114 as the parent region in the parent-child relationship table 110N (S17). Next, the updating amount p is set to "1" which is the same as the carry amount k (S19). Thereafter, the carry amount k is set to "0" (S21).

Next, based on the target region information, the numbering region 113 is identified (S7). Then, the character string "99" of the numbering region 113 is updated to "00" as the updating amount p (i.e., "1") is added (S9). Since the carry occurs (S11: YES), the carry amount k is set to "1" (S13). Since the carry amount k is equal to or greater than "1" (S15: YES), the target region information is changed to information identifying the numbering region 112 which is associated with the numbering region 113 as the parent region in the parent-child relationship table 110N (S17).

Next, the updating amount p is set to "1" which is the same as the carry amount k (S19). Thereafter, the carry amount k is set to "0" (S21).

Next, the numbering region 112 is identified based on the target region information (S7). Then, the character string "02" of the numbering region 112 is updated to "03" as the updating amount p (i.e., "1") is added (S9). Since the carry does not occur in the numbering region 112 (S11: NO), the carry amount k is "0" (S15: NO). At this stage, the content 110 of which the character strings of the numbering regions 112, 113 and 114 are "03", "00" and "00", respectively, are printed, thereby the third label being created. Thereafter, the setting values are initialized and the target region information, the carry amount k and the updating amount p are re-set to the initial values (S3).

Thereafter, based on the target region information, the numbering region 114 having the lowest hierarchical relationship is identified (S7). Then, the character string "00" of the numbering region 114 is updated to "01" as the updating amount p (i.e., "1") is added (S9). Since the carry does not occur in the numbering region 114 (S11: NO), the carry amount k is "0" (S15: NO). In this case, the content 110, in which the character string of the numbering region 114 is updated to "01" is printed, thereby the fourth label being created (S1). After the fourth label is created (S5: YES), the numbering print process is terminated.

<Deletion Process>

The user designate one of the numbering regions which are associated with the target content and stored in the RAM 404 with use of the operation panel 2. When the user inputs an instruction to delete the designated numbering region, the CPU 401 executes a deletion process described below by retrieving a program stored in the flash memory 410 and executing the same.

Figure 7:
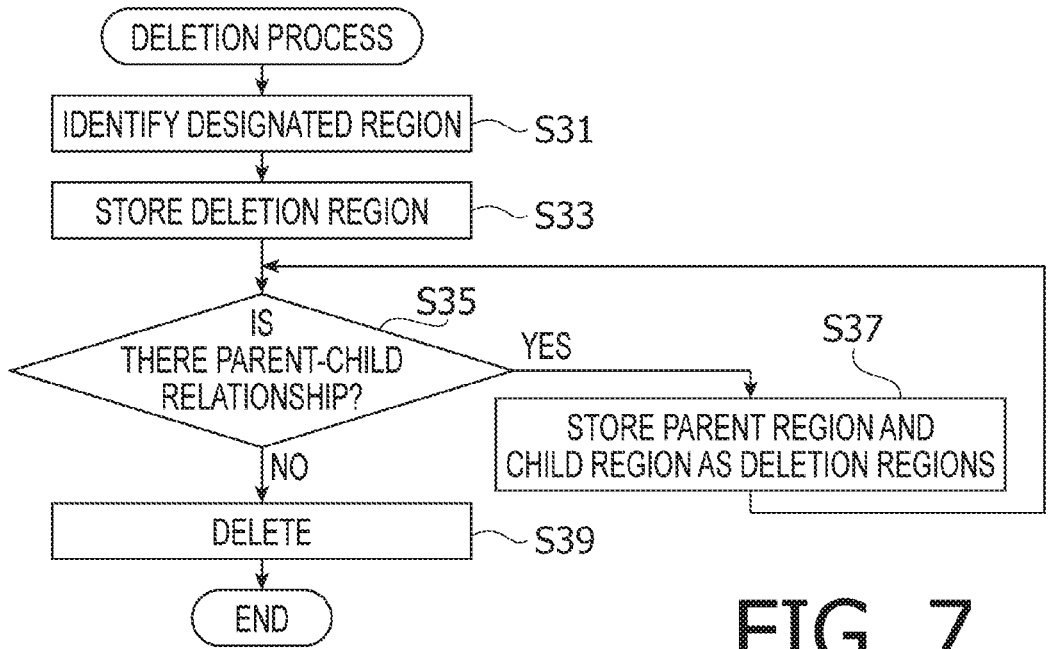
FIG. 7 is a flowchart illustrating a deletion process according to the illustrative embodiment of the disclosures.

Now, referring to FIG. 7, the deletion process will be described. Firstly, the CPU 401 identifies a region subject to deletion (hereinafter, referred to as deletion region) which is the numbering region designated through the operation panel 2 (S31). The CPU 401 stores information indicating the deletion region as identified in the RAM 404 (S33). Then, the CPU 401 determines whether (1) at least one of the parent region and the child region is associated with the deletion region, and (2) information indicating the parent region or the child region associated with the deletion region is stored in the RAM 404 as information indicating the deletion region (S35). This determination will be described in detail below.

The CPU 401 determines whether at least one of the parent region and the child region is associated with the deletion region in the parent-child relationship table 110N. When at least one of the parent region and the child region is associated with the deletion region in the parent-child relationship table 110N, the CPU 401 determines that condition (1) is satisfied.

When it is determined that the parent region is associated with the deletion region in the parent-child relationship table 110N, the CPU 401 further determines whether information indicating the parent region is stored in the RAM 404 as information indicating the deletion region. When it is determined that the information indicating the parent region is not stored in the RAM 404 as the information indicating the deletion region, the CPU 401 determines that condition (2) is satisfied (S35: YES). When it is determined that the child region is associated with the deletion region in the parent-child relationship table 110N, the CPU 401 further determines whether information indicating the child region is stored in the RAM 404 as information indicating the deletion region. When it is determined that the information indicating the child region is not stored in the RAM 404 as the information indicating the deletion region, the CPU 401 also determines that condition (2) is satisfied (S35: YES).

When it is determined that the both conditions (1) and (2) are satisfied, information indicating at least one of the parent region and the child region, which is associated with the deletion region in the parent-child relationship table 110N but not stored in the RAM 404, is stored in the RAM 40 (S37) as information indicating an additional deletion region. Thereafter, the CPU 401 returns to S35.

In S37, the CPU 401 determines whether the conditions (1) and (2) are satisfied based on the information, which is stored in the RAM 404 in S37. It is noted that, if both pieces of information respectively indicating the parent region and the child region are stored as information indicating the additional deletion region in the RAM 404, the CPU 401 determines whether the conditions (1) and (2) are satisfied in each region. When it is determined that conditions (1) and (2) are satisfied (S35: YES), the CPU 401 repeats the process of S37.

When neither of a parent region and a child region is associated with the deletion region in the parent-child relationship table 110N, the CPU 401 determines that condition (1) is not satisfied. It is noted that, even when a parent region is associated with the deletion region in the parent-child relationship table 110N (i.e., when condition (1) is satisfied), if information indicating the parent region associated with the deletion region has already been stored in the RAM 40, the CPU 401 determines that condition (2) is not satisfied (S35: NO). It is noted that, even when a child region is associated with the deletion region in the parent-child relationship table 110N (i.e., when condition (1) is satisfied), if information indicating the child region associated with the deletion region has already been stored in the RAM 40, the CPU 401 determines that condition (2) is not satisfied (S35: NO). In the above cases (i.e., S35: NO), the CPU 401 proceeds to S39.

In S39, the CPU 401 identifies all the deletion regions based on the information stored in the RAM 404. Then, the CPU 401 releases the settings with respect to the target contents in the numbering regions corresponding to the identified deletion regions. With this control, the CPU 401 deletes the numbering regions corresponding to all the deletion regions from the target contents (S39). Thereafter, the CPU 401 terminates the deletion process.

A concrete example of the deletion process shown in FIG. 7 will be described below. In the following example, it is assumed that the user inputs an instruction to delete the numbering region 113 of the content shown in FIG. 4. When the deletion process (i.e., FIG. 7) is started, the designated numbering region 113 is identified as the deletion region (S31). Then, information indicating the numbering region 113 is stored in the RAM 404 as information indicating the deletion region (S33). Next, it is determined whether the numbering region 113 satisfies conditions (1) and (2) (S35). In this example, the numbering region 112 is associated with the numbering region 113 as the parent region, and the numbering region 114 is associated with the numbering region 113 as the child region in the parent-child relationship table 110N. Therefore, condition (1) is determined to be satisfied. Further, in this example, the information indicating the numbering regions 112 and 114 is not stored in the RAM 404. Therefore, it is determined that condition (2) is satisfied (S35: YES). Then, the information indicating the numbering regions 112 and 114 is stored in the RAM 404 as information indicating the additional deletion region (S37).

Next, with respect to each of the numbering regions 112 and 114, it is determined whether conditions (1) and (2) are satisfied (S35). In this example, since the numbering region 111 is associated with the numbering region 112 as the parent region, and the numbering region 113 is associated with the numbering region 112 as the child region in the parent-child relationship table 110N, it is determined that condition (1) is satisfied. It is noted that information indicating the numbering region 113 has already been stored in the RAM 404. Therefore, with respect to the numbering region 113, it is determined that condition (2) is not satisfied. On the other hand, the information indicating the numbering region 111 is not stored in the RAM 404. Therefore, with respect to the numbering region 111, it is determined that condition (2) is satisfied (S35: YES). As a result, the information indicating the numbering region 111 is stored in the RAM 404 as the information indicating the additional deletion region.

Further, since the numbering region 113 is associated with the numbering region 114 as the parent region in the parent-child relationship table 110N, it is determined that condition (1) is satisfied. However, since the information indicating the numbering region 113 has already been stored in the RAM 404, the numbering region 114 is determined not to satisfy condition (2).

Next, with respect the numbering region 111, it is determined whether conditions (1) and (2) are satisfied (S35). In this example, since the numbering region 112 is associated with the numbering region 111 as the child region in the parent-child relationship table 110N, it is determined that condition (1) is satisfied. However, the information indicating the numbering region 112 has already been stored in the RAM 404, it is determined that condition (2) is not satisfied (S35: NO).

Figure 8:
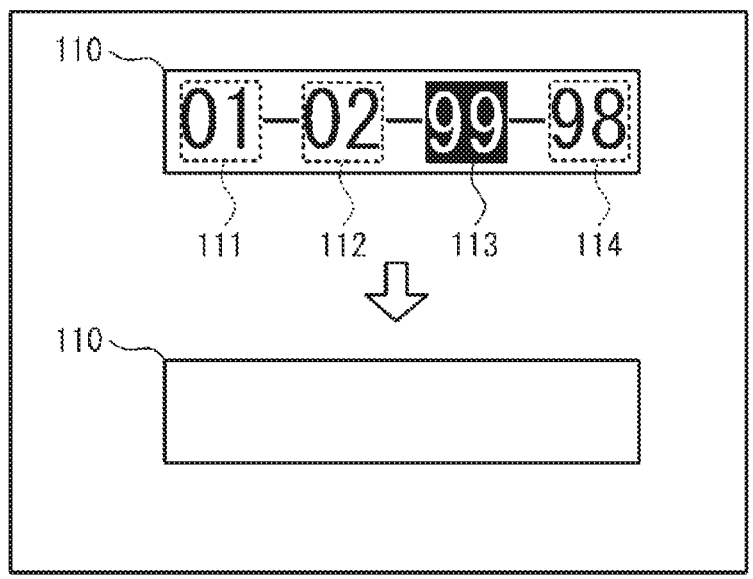
FIG. 8 is another example of the edit screen shown on the display of the tape printer according to the illustrative embodiment of the disclosures.

At this stage, the information indicating the numbering regions 111, 112, 113 and 114 is stored in the RAM 404. The numbering regions 111-114 are identified as the deletion regions. Thus, the settings with respect to the target contents of the identified numbering regions 111-114 are released. With this control, the numbering regions 111-114 are deleted from the target content (S39). In this case, as shown in FIG. 8, all the numbering regions 111-114 included in the content 110 are deleted from the content 110.

As described above, the CPU 401 of the tape printer 1 updates the characters included in the target region among multiple numbering regions (S9). When the carry occurs when the characters are updated (S11: YES), the parent region associated with the target region in the parent-child relationship table 110N is newly set as the target region (S17). Then, the CPU 401 updates the characters included the newly set target region (S9). When the carry does not occur during updating of the characters (S15: NO), the CPU 401 creates print data of the target content in which the regions including the updated characters (S1).

If the deletion region among the multiple numbering regions set as the target contents is deleted, the carry in the deletion region does not occur. Therefore, in such a case, the characters included in the parent region which is associated with the deletion region in the parent-child relationship table 110N will not be updated.

Further, when the deletion region is deleted, the region including the characters to be updated in accordance with the carry of the characters in the child region associated with the deletion region in the parent-child relationship table 110N does not exist.

When the deletion region is identified (S31), the CPU 401 deletes the deletion region, the parent region corresponding to the deletion region, and the child region corresponding to the deletion region from the target content (S39). With the above control, even when any one of the multiple numbering regions to which the parent-child relationship is set is deleted, the CPU 401 can suppress creation of the print data of the target content in which an updating method of the characters is unstable.

<First Modification>

Figure 9:
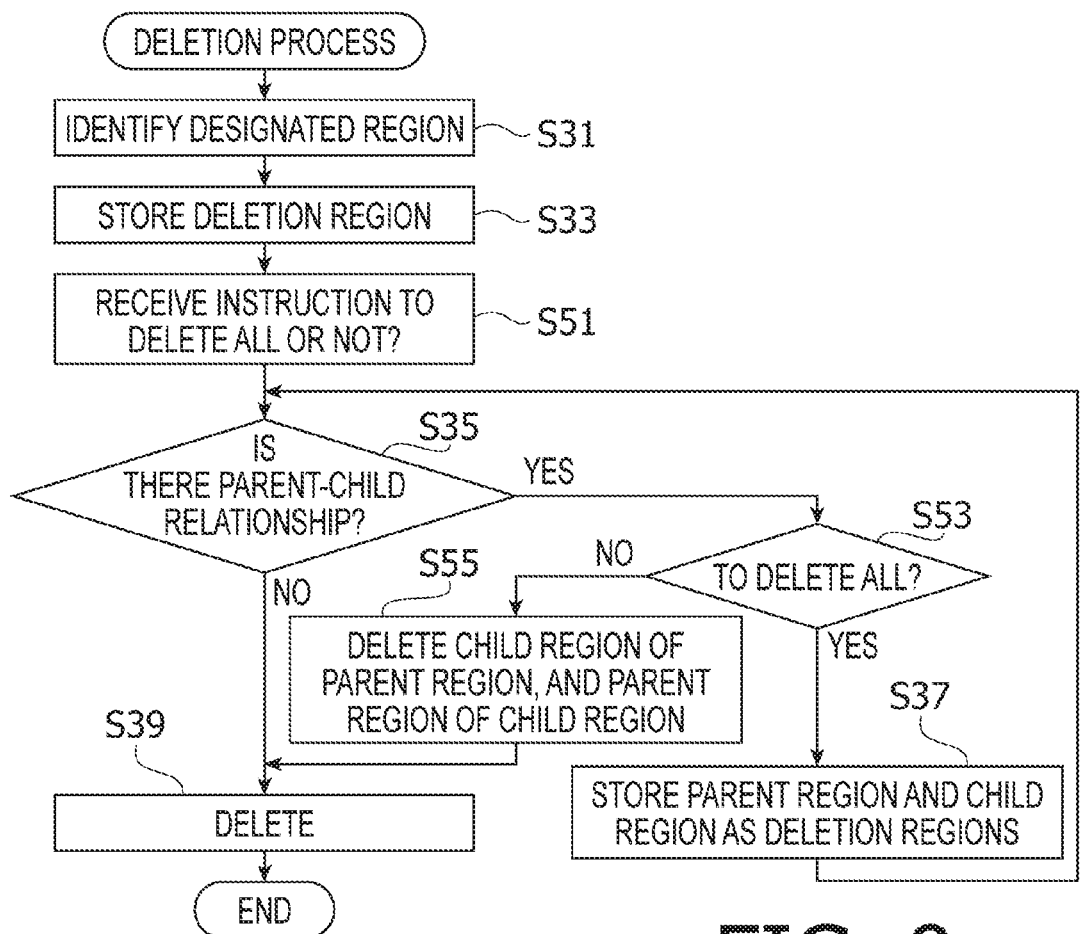
FIG. 9 is a flowchart illustrating a deletion process according to a first modification of the illustrative embodiment of the disclosures.
Figure 10:
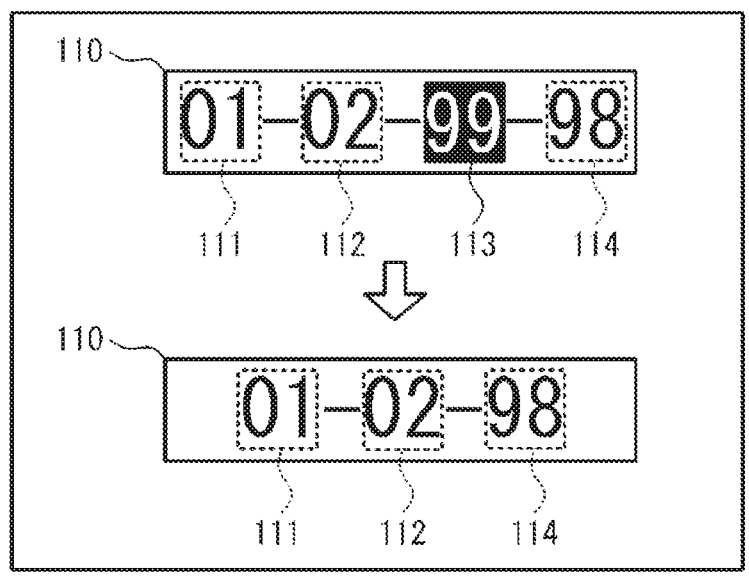
FIG. 10 is an example of the edit screen shown on the display of the tape printer according to the first modification or a second modification of the illustrative embodiment of the disclosures.

Referring to FIGS. 9 and 10, a deletion process according to a first modification of the embodiment will be described. The first modification is different from the above-described embodiment in that, when the designated numbering region is deleted, the region having a parent relationship with the designated region and the region having a child relationship with the designated region will not be deleted. In the first modification, the user designates a numbering region which is associated with the target content and stored in the RAM 404 with use of the operation panel 2. Then, the user instructs deletion of the designated numbering region. The CPU 401 executes a deletion process described below by retrieving a program stored in the flash memory 410 and executing the same.

Referring to FIG. 9, the deletion process according to the first modification will be described. In the following description, portions similar to those in the deletion process shown in FIG. 7 will be assigned with the same step numbers used in FIG. 7 and description thereof will be omitted or simplified for brevity.

Firstly, the CPU 401 identifies the numbering region designated with use of the operation panel 2 as the deletion region (S31). Then, the CPU 401 stores information indicating the identified deletion region in the RAM 404 (S33). Next, the CPU 401 receives an instruction whether regions respectively having the parent relationship and child relationship with the designated deletion region are to be deleted or not through the operation panel 2 (S51).

Based on the information stored in the RAM 404 in S33, the CPU 401 determines whether conditions (1) and (2) are satisfied (S35). When it is determined that conditions (1) and (2) are not satisfied (S35: NO), the CPU 401 proceeds to S39. When it is determined that conditions (1) and (2) are satisfied (S35: YES), the CPU 401 further determines whether the deletion instruction is received in S51 (S53). When it is determined that the CPU 401 receives the deletion instruction (S53: YES), the CPU 401 proceeds to S37. Since S37 has described above, description thereof will be omitted here for brevity.

When it is determined that the instruction not to delete is received in S53 (S53: NO), the CPU 401 proceeds to S55. The CPU 401 identifies the deletion region based on the information stored in the RAM 404 in S33.

When a parent region is associated with the deletion region in the parent-child relationship table 110N (hereinafter, such a parent region will be referred to as a deletion parent region), the CPU 401 identifies a child region associated with the deletion parent region in the parent-child relationship table 110N.

It is noted that the deletion region is associated with the deletion parent region as the child region. The CPU 401 deletes the deletion region which is associated with the deletion parent region as the child region (S55).

When a child region is associated with the deletion region in the parent-child relationship table 110N (hereinafter, such a child region will be referred to as a deletion child region), the CPU 401 identifies a parent region associated with the deletion child region in the parent-child relationship table 110N.

It is noted that the deletion region is associated with the deletion child region as the parent region. The CPU 401 deletes the deletion region which is associated with the deletion child region as the parent region (S55).

The CPU 401 deletes the parent region and the child region which are associated with the deletion region in the parent-child relationship table 110N. With the above control, the CPU 401 deletes the deletion region from the target content (S55). It is noted that, in the parent-child relationship table 110N, the deletion region and the parent/child relationship with the deletion region are deleted, and the deletion parent region and the deletion child region are not deleted from the target content. Thereafter, the CPU 401 proceeds to S39. Since S39 is similar to that in FIG. 7 and description thereof will be omitted for brevity.

A concrete example of the deleting process shown in FIG. 9 will be described. In the following description, it is assumed that the user executes an operation to designate the numbering region 113 of the content 110 shown in FIG. 4. When the deleting process shown in FIG. 9 is started, the numbering region 113 is identified as the deletion region (S31). Then, information indicating the numbering region 113 is stored in the RAM 404 as information of the deletion region (S33). Next, it is assumed that an instruction not to delete the regions having parent relationship and the child relationship with the deletion region at the same time (S51).

It is determined whether the numbering region 113 satisfies conditions (1) and (2). In the parent-child relationship table 110N, the numbering region 112 is associated with the numbering region 113 as the parent region, and the numbering region 114 is associated with the numbering region 113 as the child region (S35: YES). Further, an instruction not to delete the regions having parent/child relationship with the deletion region has been received (S53: NO). In such a case, in the parent-child relationship table 110N, the numbering region 113 which is associated with the numbering region 112 as the child region is deleted, and the numbering region 113 which is associated with the numbering region 114 (deletion child region) as the parent region is deleted (S55). Further, in the parent-child relationship table 110N, the numbering region 112 which is associated with the numbering region 113 as the parent region is deleted, and the numbering region 114 which is associated with the numbering region 113 as the child region is deleted. With the above control, the numbering region 113 is deleted from the target content (S39).

When the deletion process is executed as described above, only the numbering region 113 is deleted from the content 110, and the numbering regions 111, 112, 114 are remained in the content 110 as shown in FIG. 10. It is noted that, in the parent-child relationship table 110N, no parent-child relationship is set between the numbering regions 112 and 114. Therefore, even if the carry occurs in the numbering character string of the numbering region 114, the numbering character strings of the numbering regions 111 and 112 are not updated.

As described above, according to the first modification, the CPU 401 can switch the operation to or not to delete the regions having the parent relationship and the child relationship with the deletion region in accordance with the instruction (S53). Therefore, even if the numbering region to be deleted is designated, in accordance with the user instruction, print data of the target content including a region having the parent relationship and a region having the child relationship with the deletion region can be created.

According to the first modification, the CPU 401 only deletes the child region associated with the deletion parent region in the parent-child relationship table 110N (i.e., the deletion region), and the parent region associated with the deletion child region in the parent-child relationship table 110N (i.e., the deletion region), and does not sets new parent regions or new child regions. With this control, the CPU 401 can release the parent/child relationship between the deletion parent region and the deletion region, and between the deletion child region and the deletion region. Accordingly, the CPU 401 can clarify an updating mode of the deletion parent region and the deletion child region included in the target content. Accordingly, the CPU 401 can create the print data of the target content including the numbering regions of which updating mode is sufficiently clarified.

<Second Modification>

Figure 11:
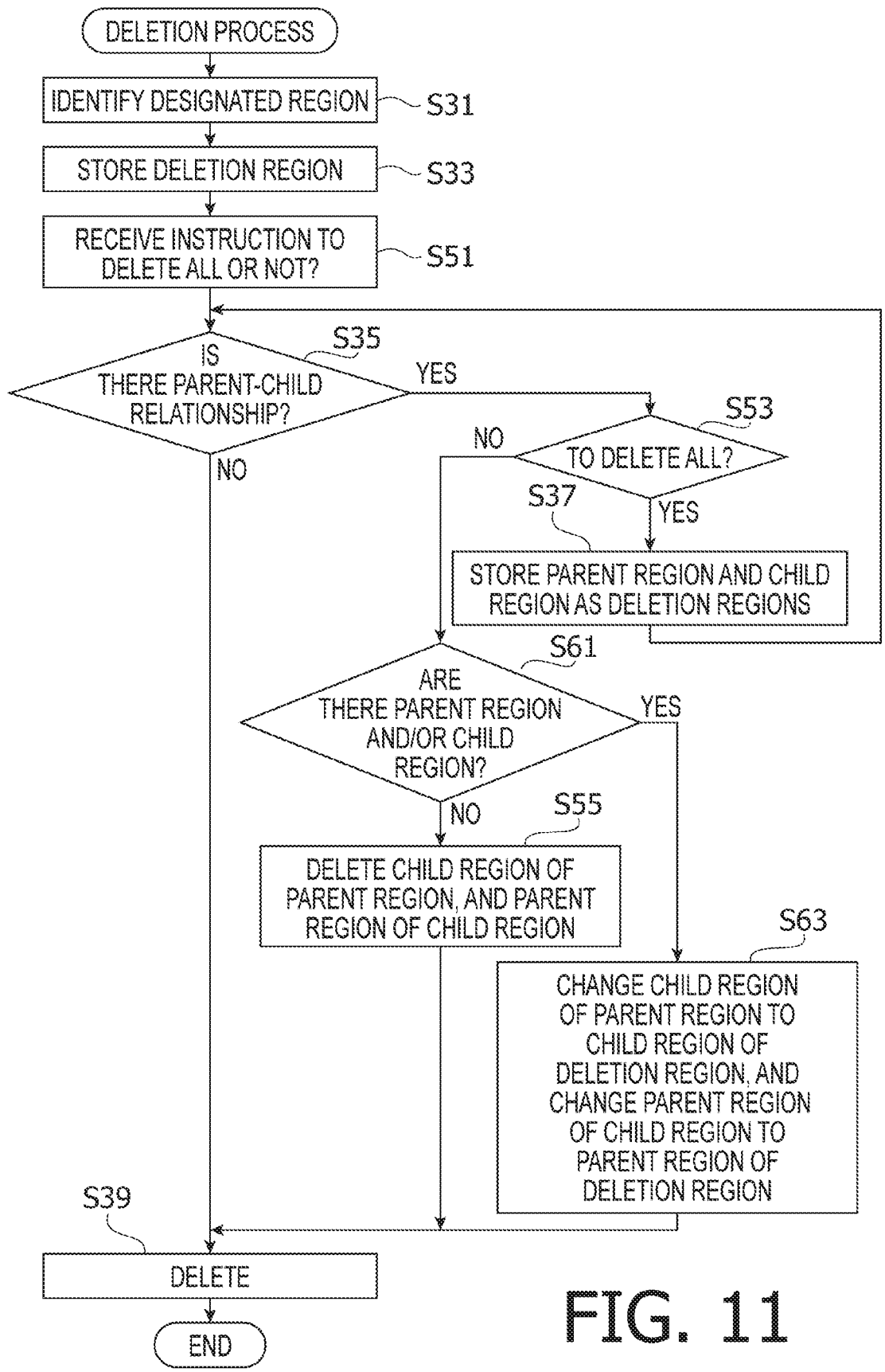
FIG. 11 is a flowchart illustrating a deletion process according to the second modification of the illustrative embodiment of the disclosures.

Referring to FIG. 11, the deletion process according to the second modification will be described. In the following description, portions similar to those in the deletion processes shown in FIGS. 7 and 9 will be assigned with the same step numbers used therein and description thereof will be omitted or simplified for brevity.

The second modification is different from the above-described first modification in that, when the deletion region is associated with both the parent region and the child region, a new parent-child relationship is set between the parent region and the child region when the deletion region is deleted. In the second modification, the user designates a numbering region which is associated with the target content and stored in the RAM 404 with use of the operation panel 2. Then, the user instructs deletion of the designated numbering region. The CPU 401 executes a deletion process described below by retrieving a program stored in the flash memory 410 and executing the same.

Based on the information stored in the RAM 404 in S33, the CPU 401 determines whether conditions (1) and (2) are satisfied (S35). When it is determined that conditions (1) and (2) are not satisfied (S35: NO), the CPU 401 proceeds to S39. When it is determined that conditions (1) and (2) are satisfied (S35: YES), the CPU 401 further determines whether the deletion instruction is received in S51 (S53). When it is determined that the CPU 401 receives the deletion instruction (S53: YES), the CPU 401 proceeds to S37. Since S37 has described above, description thereof will be omitted here for brevity.

The CPU 401 identifies the deletion region based on the information stored in the RAM 404 in S33. Then, in S61, the CPU 401 determines whether the deletion region is associated with both the parent region and the child region in the parent-child relationship table 110N (S61).

When it is determined that only one of the parent region and the child region is associated with the deletion region (S61: NO), the CPU 401 proceeds to S55. When only the parent region is associated with the deletion region in the parent-child relationship table 110N, the CPU 401 deletes the deletion region, which is associated with the deletion parent region as the parent region from the parent-child relationship table 110N (S55). When only the child region is associated with the deletion region in the parent-child relationship table 110N, the CPU 401 deletes the deletion region, which is associated with the deletion child region as the parent region from the parent-child relationship table 110N (S55). Further, the CPU 401 deletes the parent region or the child region which is associated with the deletion region in the parent-child relationship table 110N. With the above control, the CPU 401 deletes the deletion region from the target content (S55). Thereafter, the CPU 401 proceeds to S39. Description of S39 will be omitted for brevity.

When it is determined that both the parent region and the child region are associated with the deletion region (S61: YES), the CPU 401 proceeds to S63. The CPU 401 changes the deletion region, which is associated with the deletion parent region as the child region in the parent-child relationship table 110N to a deletion child region (S63). Further, the CPU 401 changes the deletion region, which is associated with the deletion parent region as the parent region in the parent-child relationship table 110N to a deletion parent region (S63). Further, the CPU 401 deletes the parent region and the child region both associated with the deletion region from the parent-child relationship table 110N. With the above control, the CPU 401 deletes the deletion region from the target content (S55). Thereafter, the CPU 401 proceeds to S39. Description on S39 will be omitted for brevity.

A concrete example of the deleting process shown in FIG. 11 will be described. In the following description, it is assumed that the user executes an operation to designate the numbering region 113 of the content 110 shown in FIG. 4. When the deleting process shown in FIG. 11 is started, the numbering region 113 is identified as the deletion region (S31). Then, information indicating the numbering region 113 is stored in the RAM 404 as information of the deletion region (S33). Next, it is assumed that an instruction not to delete the regions having parent relationship and the child relationship with the deletion region at the same time (S51).

It is determined whether the numbering region 113 satisfies conditions (1) and (2). In the parent-child relationship table 110N, the numbering region 112 is associated with the numbering region 113 as the parent region, and the numbering region 114 is associated with the numbering region 113 as the child region (S35: YES). Further, an instruction not to delete the regions having parent/child relationship with the deletion region has been received (S53: NO).

It is noted that, the numbering region 113 is associated with both the parent region (i.e., the numbering region 112) and the child region (i.e., the numbering region 114) (S61: YES). In this case, the numbering region 113, which is associated with the numbering region 112 (i.e., the deletion parent region) as the child region in the parent-child relationship table 110N is changed to the numbering region 114 (i.e., the deletion child region) (S63).

Further, the numbering region 113, which is associated with the numbering region 114 (i.e., the deletion child region) as the parent region in the parent-child relationship table 110N is changed to the numbering region 112 (S63). Then, in the parent-child relationship table 110N, the numbering region 112 which is associated with the numbering region 113 as the parent region and the numbering region 114 which is associated with the numbering region 113 as the child region are deleted. With this control, the numbering region 113 is deleted from the target content (S39).

When the deletion process is executed as described above, as shown in FIG. 10, only the numbering region 113 is deleted from the content 110, and the numbering regions 111, 112 and 113 are remained in the content 110. It is noted that, in the parent-child relationship table 110N, the numbering region 114 is associated with the numbering region 112 as the child region, and the numbering region 112 is associated with the numbering region 114 as the parent region. Therefore, if the carry occurs in the numbering character string of the numbering region 114, the character string of the numbering region 112 is updated in accordance with the carry amount.

As described above, in the second modification, when the instruction to delete the deletion region is received, the CPU 401 can set a new parent-child relationship between a region having the parent relationship with the deletion region (i.e., the deletion parent region) and a region having the child relationship with the deletion region (i.e., the deletion child region). In such a case, if the carry occurs when the numbering character string included in the deletion child region is updated, the CPU 401 can update the numbering character string included in the deletion parent region. Further, if such a carry does not occur, the CPU 401 can create the print data of the target content in which the numbering region includes the updated numbering character string.

<Further Modifications>

The present disclosures should not be limited to the illustrative embodiment and modifications described above, but further modifications may be made. For example, the deletion process described above needs not be limited to a case where it is executed in the tape printer 1, but can be executed by a well-known personal computer in which an application to edit print data which causes a tape printer to execute printing of the content.

In the above-described embodiment and modifications, the maximum number of the parent region and the child region which can be associated with one numbering region in the parent-child relationship table 110N is defined to be one. This configuration may be modified such that more than one parent regions and/or more than one child regions can be associated with one numbering region in the parent-child relationship table 110N.

In the first and second modifications, an instruction to delete the regions having the parent/child relationship with the designated numbering region is input through the operation panel 2 (S51). Alternatively, such an instruction to delete or not to delete may have been stored in the flash memory 410 as initial setting information. In such a case, the CPU 401 may execute judgment in S51 by retrieving the initial setting information from the flash memory 410.

The CPU 401 may generate parent-child relationship information indicative of the parent-child relationship among multiple numbering regions included in the target content based on the parent-child relationship table 110N, and display the same on the display 5. Further, in accordance with a modification (update) of the parent-child relationship table 110N by the above-described deletion process, the CPU 401 may change the parent-child relationship information displayed on the display 5.

What is claimed is:

1. A data generating apparatus, comprising:
a first storage configured to store a content to which multiple regions are assigned, each of the multiple regions including displayed characters which can be repeatedly advanced in accordance with a particular advancing order, wherein the displayed characters are to be printed on a medium;
a second storage configured to store a parent-child relationship table, which is a table illustrating a parent-child relationship among the multiple regions, a parent region having a parent relationship and/or a child region having a child relationship being associated with each of the multiple regions; and
a processor,
wherein the processor is configured to serve as:
a deletion region identifier configured to identify one of the multiple regions as a deletion region;
a first deleter configured to delete the deletion region identified by the deletion region identifier from the content;
a determiner configured to determine, based on the parent-child relationship table, whether there exists a parent region and/or a child region associated with the deletion region;
an additional region identifier configured to:
in response to the determiner determining that there exists the parent region associated with the deletion region, identify the parent region as the deletion region; and
in response to the determiner determining that there exists the child region associated with the deletion region, identify the child region as the deletion region; and
a second deleter configured to delete the deletion region identified by the additional region identifier;
a target region identifier configured to identify one of the multiple regions as a target region;
an updater configured to update the displayed characters included in the target region identified by the target region identifier by advancing the displayed characters included in the target region identified by the target region identifier in accordance with the particular advancing order;
a changer configured to change the target region to a parent region of the one of the multiple regions currently identified as the target region based on the parent-child relationship table stored in the second storage in response to a carry, in which the displayed characters to be printed and included in the one of the multiple regions identified as the target region are changed from a last arrangement in the particular advancing order to a first arrangement in the particular advancing order, occurring when updated by the updater; and
a generator configured to generate print data of the content of which characters are updated based on the content stored in the first storage when no carry occurs when the characters included in the target region are updated by the updater, and
wherein the updater is further configured to advance the characters included in the parent region, which has been set as the target region by the changer in response to the carry.

2. The data generating apparatus according to claim 1, wherein the processor further serves as a receiver configured to receive an instruction which instructs whether each of the parent region and the child region is to be deleted,
wherein the second deleter is configured to:
delete the parent region and the child region when an instruction to delete both the parent region and the child region is received; and
prohibit deletion of the parent region and the child region when an instruction not to delete the parent region and the child region is received.

3. The data generating apparatus according to claim 2, the processor further serving as a third deleter configured to delete the deletion region identified by the deletion region identifier, when the receiver receives an instruction not to delete the parent region and the child region.

4. A non-transitory computer-readable medium for a data generating apparatus having a computer, a first storage configured to store a content to which multiple regions are assigned, each of the multiple regions including displayed characters to be printed, the characters being repeatedly advanceable in accordance with a particular advancing order, and a second storage configured to store a parent-child relationship table, which is a table specifying a parent-child relationship among the multiple regions, a parent region having a parent relationship and/or a child region having a child relationship being associated with each of the multiple regions, the non-transitory computer-readable medium containing instructions which, when executed by the computer, cause the data generating apparatus to execute:

a deletion region identifying step to identify one of the multiple regions as a deletion region;

a first deleting step to delete the deletion region identified by the deletion region identifying step from the content;

a determination step to determine, based on the parent-child relationship table, whether there exists a parent region and/or a child region associated with the deletion region;

an additional region identifying step to:
in response to the determining that there exists the parent region associated with the deletion region, identify the parent region as the deletion region; and
in response to the determining that there exists the child region associated with the deletion region, identify the child region as the deletion region;

a second deleting step to delete the deletion region identified in the additional region identifying step;

a target region identifying step to identify one of the multiple regions as a target region;

an updating step to update the characters included in the target region identified in the target region identifying step by advancing the characters included in the target region identified by the target region identifying step in accordance with the particular advancing order;

a changing step to change the target region to a parent region of the one of the multiple regions currently identified as the target region based on the parent-child relationship table stored in the second storage in response to a carry, in which the displayed characters to be printed and included in the one of the multiple regions identified as the target region change from a last arrangement in the particular advancing order to a first arrangement in the particular advancing order, occurring when updated by the updating step; and a generating step to generate print data of the content of which characters are updated based on the content stored in the first storage when no carry occurs when the characters included in the target region are updated by the updating step, wherein the updating step further advances the displayed characters included in the parent region which has been set as the target region by the changing step in response to the carry.

5. The non-transitory computer-readable medium according to claim 4, wherein the instructions cause the data generating apparatus to further execute a receiving step to receive an instruction indicating whether each of the parent region and the child region is to be deleted, wherein the second deleting step includes:
deleting the parent region and the child region when an instruction to delete both the parent region and the child region is received; and
prohibiting deletion of the parent region and the child region when an instruction not to delete the parent region and the child region is received.

6. The non-transitory computer-readable medium according to claim 5, wherein the instructions cause the data generating apparatus to further execute a third deleting step to delete the deletion region identified in the deletion region identifying step, when the receiving step receives an instruction not to delete the parent region and the child region.

7. A data generating method for a data generating apparatus having a computer, a first storage configured to store a content to which multiple regions are assigned, each of the multiple regions including displayed characters to be printed, the characters being repeatedly advanceable in accordance with a particular advancing order, and a second storage configured to store a parent-child relationship table, which is a table specifying a parent-child relationship among the multiple regions, a parent region having a parent relationship and/or a child region having a child relationship being associated with each of the multiple regions, the method comprising:
a deletion region identifying step to identify one of the multiple regions as a deletion region;

a first deleting step to delete the deletion region identified by the deletion region identifying step from the content;

a determination step to determine, based on the parent-child relationship table, whether there exists a parent region and/or a child region associated with the deletion region;

an additional region identifying step to:
in response to determining that there exists the parent region associated with the deletion region, identify the parent region as the deletion region; and
in response to determining that there exists the child region associated with the deletion region, identify the child region as the deletion region; and a second deleting step to delete the deletion region identified in the additional region identifying step;

a target region identifying step to identify one of the multiple regions as a target region;

an updating step to update the displayed characters included in the target region identified by the target region identifying step by advancing the displayed characters included in the target region identified by the target region identifying step in accordance with the particular advancing order;

a changing step to change the target region to a parent region of the one of the multiple regions currently identified as the target region based on the parent-child relationship table stored in the second storage in response to a carry, in which the displayed characters included in the one of the multiple regions identified as the target region change from a last arrangement in the particular advancing order to a first arrangement in the particular advancing order, occurring when updated by the updating step; and a generating step to generate print data of the content of which characters are updated based on the content stored in the first storage when no carry occurs when the characters included in the target region are updated by the updating step, wherein the updating step further advances the displayed characters included in the parent region set as the target region by the changing step in response to the carry.

8. The method according to claim 7,
further comprising a receiving step to receive an instruction indicating whether each of the parent region and the child region is to be deleted, wherein the second deleting step further includes:
    deleting the parent region and the child region when an instruction to delete both the parent region and the child region is received; and
    prohibiting deletion of the parent region and the child region when an instruction not to delete the parent region and the child region is received.

9. The method according to claim 8, further comprising a third deleting step to delete the deletion region identified in the deletion region identifying step, when the receiving step receives an instruction not to delete the parent region and the child region.

* * * * *